(12) United States Patent
Keiichiro

(10) Patent No.: US 11,358,670 B2
(45) Date of Patent: Jun. 14, 2022

(54) STRADDLE-TYPE VEHICLE INFORMATION PROCESSOR AND STRADDLE-TYPE VEHICLE INFORMATION PROCESSING METHOD

(71) Applicant: Robert Bosch GmbH, Stuttgart (DE)

(72) Inventor: Fukuzawa Keiichiro, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 16/605,329

(22) PCT Filed: Mar. 14, 2018

(86) PCT No.: PCT/IB2018/051680
§ 371 (c)(1),
(2) Date: Oct. 15, 2019

(87) PCT Pub. No.: WO2018/193322
PCT Pub. Date: Oct. 25, 2018

(65) Prior Publication Data
US 2020/0070920 A1 Mar. 5, 2020

(30) Foreign Application Priority Data

Apr. 18, 2017 (JP) .............................. JP2017-081751

(51) Int. Cl.
*B62J 45/415* (2020.01)
*B62K 11/00* (2006.01)
(Continued)

(52) U.S. Cl.
CPC ........... *B62J 45/4151* (2020.02); *B62J 27/00* (2013.01); *B62J 45/414* (2020.02); *B62K 11/00* (2013.01); *G07C 5/02* (2013.01)

(58) Field of Classification Search
CPC ...... B60W 2300/36; B62K 11/00; G07C 5/02; B62J 27/00; B62J 45/00; B62J 45/414; B62J 45/4151
See application file for complete search history.

(56) References Cited

U.S. PATENT DOCUMENTS 5,098,041 A * 3/1992 Uetrecht .................. B64G 1/38
244/164
6,055,472 A * 4/2000 Breunig ................ B60R 21/013
701/45
(Continued)

FOREIGN PATENT DOCUMENTS

EP 0430813 A1 * 6/1991 ........... B60R 21/013
EP 2637144 9/2013
(Continued)

OTHER PUBLICATIONS

International Search Report for Application No. PCT/IB2018/051680 dated Jun. 6, 2018 (English Translation, 3 pages).

*Primary Examiner* — Hunter B Lonsberry
*Assistant Examiner* — Daniel L Greene
(74) *Attorney, Agent, or Firm* — Michael Best & Friedrich LLP

(57) ABSTRACT

The invention obtains a straddle-type vehicle information processor and a straddle-type vehicle information processing method capable of recognizing that a traveling straddle-type vehicle enters a falling phase with a high degree of accuracy at appropriate timing and thereby contributes to improvement in occupant safety.
A straddle-type vehicle information processor 10 includes: a posture information acquisition section 11 that at least acquires a roll rate Rr and a yaw rate Ry generated in a traveling straddle-type vehicle 1 as posture information; and a falling phase recognition section 12 that recognizes that the straddle-type vehicle 1 enters a falling phase in the case
(Continued)

where a change in a degree of instability over time, which is derived at least on the basis of the roll rate Rr and the yaw rate Ry, shows an increasing tendency.

14 Claims, 2 Drawing Sheets

(51) Int. Cl.
   *G07C 5/02* (2006.01)
   *B62J 45/414* (2020.01)
   *B62J 27/00* (2020.01)

(56) References Cited

U.S. PATENT DOCUMENTS

| | | | |
|---|---|---|---|
| 6,428,118 B1 * | 8/2002 | Blosch | B60T 8/17554 |
| | | | 303/142 |
| 2004/0162654 A1 * | 8/2004 | Lu | B60G 17/0162 |
| | | | 701/38 |
| 2009/0152940 A1 * | 6/2009 | Mercier | B62K 5/027 |
| | | | 303/113.2 |
| 2014/0236426 A1 * | 8/2014 | Kosaka | B62K 11/007 |
| | | | 701/41 |
| 2015/0158360 A1 * | 6/2015 | Uebayashi | B62K 5/10 |
| | | | 280/5.508 |
| 2015/0224845 A1 * | 8/2015 | Anderson | B60G 13/14 |
| | | | 701/37 |
| 2016/0161526 A1 * | 6/2016 | Miki | B60W 40/10 |
| | | | 701/124 |
| 2019/0111936 A1 * | 4/2019 | Fu | B60W 40/072 |

FOREIGN PATENT DOCUMENTS

| | | | | |
|---|---|---|---|---|
| EP | 2886431 | 6/2015 | | |
| JP | 2006151280 | 6/2006 | | |
| JP | 2014162260 | 9/2014 | | |
| WO | WO-2004078560 A1 * | 9/2004 | | B62D 5/046 |
| WO | 2008067900 | 6/2008 | | |

* cited by examiner

STRADDLE-TYPE VEHICLE INFORMATION PROCESSOR AND STRADDLE-TYPE VEHICLE INFORMATION PROCESSING METHOD

BACKGROUND OF THE INVENTION

The invention relates to an information processor and an information processing method for recognizing that a traveling straddle-type vehicle enters a falling phase.

As a conventional vehicle information processor, a vehicle information processor that includes a posture information acquisition section and a falling phase recognition section has been available. The posture information acquisition section acquires posture information of a traveling vehicle, and the falling phase recognition section recognizes that the traveling vehicle enters a falling phase on the basis of the posture information acquired by the posture information acquisition section. The posture information acquisition section acquires, as the posture information, three-axis angular velocities generated in the traveling vehicle, that is, a pitch rate, a roll rate, and a yaw rate. The falling phase recognition section recognizes that the traveling vehicle enters the falling phase when at least one of the three-axis angular velocities exceeds a limit value (for example, see JP-T-2000-508060).

SUMMARY OF THE INVENTION

A target of the recognition of the falling phase by the conventional vehicle information processor is a vehicle with relatively high travel stability such as an automobile or a track, that is, a vehicle in which a change in the angular velocity occurred during the travel is relatively small. The target of the recognition of the falling phase by the conventional vehicle information processor is also a vehicle with relatively high occupant safety such as the automobile or the track. Accordingly, in the case where the conventional vehicle information processor is used as a straddle-type vehicle information processor so as to recognize that a traveling straddle-type vehicle enters the falling phase, a frequency of erroneous recognition that the straddle-type vehicle enters the falling phase is increased due to the relatively significant change in the angular velocity occurred during the travel. In addition, in the case where the limit value is set high to prevent such an increase, the recognition of the falling phase delays despite a fact that the safety of the occupant is relatively low.

The invention has been made in view of the above-described problems, and therefore obtains a straddle-type vehicle information processor and a straddle-type vehicle information processing method capable of recognizing that a traveling straddle-type vehicle enters a falling phase with a high degree of accuracy at appropriate timing and thereby contributing to improvement in occupant safety.

An aspect of the invention relates to a straddle-type vehicle information processor, and the straddle-type vehicle information processor includes: a posture information acquisition section that acquires posture information of a traveling straddle-type vehicle; and a falling phase recognition section that recognizes that the traveling straddle-type vehicle enters a falling phase on the basis of a change in the posture information, which is acquired by the posture information acquisition section, over time. The posture information acquisition section at least acquires a roll rate and a yaw rate that are generated in the traveling straddle-type vehicle as the posture information. The falling phase recognition section recognizes that the straddle-type vehicle enters the falling phase in the case where a change in a degree of instability of the traveling straddle-type vehicle over time shows an increasing tendency, the degree of instability being derived at least on the basis of the roll rate and the yaw rate acquired by the posture information acquisition section.

Another aspect of the invention relates to a straddle-type vehicle information processing method, and the straddle-type vehicle information processing method includes: a posture information acquisition step of acquiring posture information of a traveling straddle-type vehicle; and a falling phase recognition step of recognizing that the traveling straddle-type vehicle enters a falling phase on the basis of a change in the posture information, which is acquired in the posture information acquisition step, over time. In the posture information acquisition step, at least a roll rate and a yaw rate that are generated in the traveling straddle-type vehicle are acquired as the posture information. In the falling phase recognition step, it is recognized that the straddle-type vehicle enters the falling phase in the case where a change in a degree of instability of the traveling straddle-type vehicle over time shows an increasing tendency, the degree of instability being derived at least on the basis of the roll rate and the yaw rate acquired in the posture information acquisition step.

In the straddle-type vehicle information processor and the straddle-type vehicle information processing method according to the invention, at least the roll rate and the yaw rate, which are generated in the traveling straddle-type vehicle, are acquired as the posture information. It is recognized that the straddle-type vehicle enters the falling phase in the case where the change in the degree of instability over time, which is derived at least on the basis of the roll rate and the yaw rate, shows the increasing tendency. Accordingly, even in the case where one of three-axis angular velocities of the straddle-type vehicle is abruptly increased during travel, such erroneous recognition that the straddle-type vehicle enters the falling phase is prevented. In addition, it is possible to recognize that the straddle-type vehicle enters the falling phase at a stage before one of the three-axis angular velocities becomes excessively high. Therefore, the invention can contribute to improvement in occupant safety.

DETAILED DESCRIPTION

A description will hereinafter be made on a straddle-type vehicle information processor and a straddle-type vehicle information processing method according to the invention by using the drawings. Note that a configuration, an operation, and the like, which will be described below, constitute merely one example and each of the straddle-type vehicle information processor and the straddle-type vehicle information processing method according to the invention is not limited to a case with such a configuration, such an operation, and the like.

A description will hereinafter be made on a straddle-type vehicle information processor according to an embodiment.

<Configuration of Straddle-Type Vehicle Information Processor>

A description will be made on a configuration of the straddle-type vehicle information processor according to the embodiment.

Figure 1:
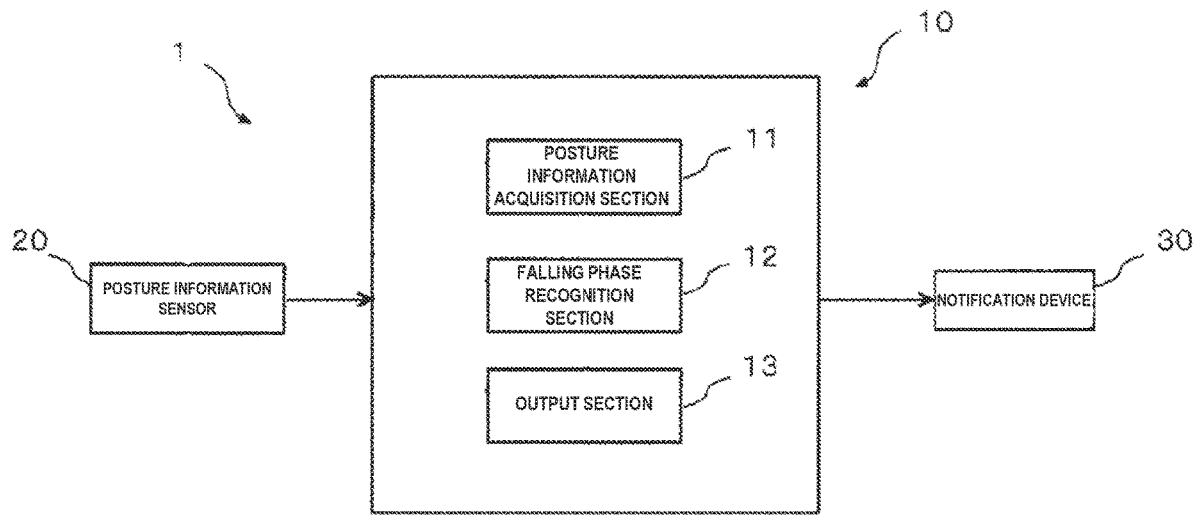
FIG. 1 is a diagram of an exemplary system configuration of a straddle-type vehicle information processor according to an embodiment of the invention.

FIG. 1 is a diagram of an exemplary system configuration of the straddle-type vehicle information processor according to the embodiment of the invention.

As depicted in FIG. 1, a straddle-type vehicle information processor 10 includes a posture information acquisition section 11, a falling phase recognition section 12, and an output section 13. The straddle-type vehicle information processor 10 is mounted on a straddle-type vehicle 1. The straddle-type vehicle 1 means a type of a vehicle on which an occupant is seated in a manner to straddle. Examples of the straddle-type vehicle 1 are a motorcycle (a two-wheeled motor vehicle, a three-wheeled motor vehicle, and the like) and an all-terrain vehicle.

A posture information sensor 20 is connected to the straddle-type vehicle information processor 10. When the posture information acquisition section 11 receives output information from the posture information sensor 20, the posture information acquisition section 11 acquires a roll rate Rr, a yaw rate Ry, and the like that are generated in the traveling straddle-type vehicle 1 as posture information.

The posture information sensor 20 is mounted on the straddle-type vehicle 1. The posture information sensor 20 is an inertial measurement unit (IMU) that includes a three-axis gyroscope sensor and a three-directional acceleration sensor, for example. The posture information acquisition section 11 may receive the roll rate Rr itself from the posture information sensor 20 or may receive another physical quantity that can substantially be converted to the roll rate Rr. In addition, the posture information acquisition section 11 may receive the yaw rate Ry itself from the posture information sensor 20 or may receive another physical quantity that can substantially be converted to the yaw rate Ry.

The falling phase recognition section 12 executes falling phase recognition processing, which will be described below, on the basis of the posture information (the roll rate Rr, the yaw rate Ry, and the like) acquired by the posture information acquisition section 11, and thereby recognizes that the straddle-type vehicle 1 enters a falling phase.

When the falling phase recognition section 12 recognizes that the straddle-type vehicle 1 enters the falling phase, the output section 13 outputs a trigger signal to a notification device 30. When receiving the trigger signal, the notification device 30 executes an operation to notify the occupant that the straddle-type vehicle 1 enters the falling phase. The notification device 30 may be a device that outputs visual notification such as a display or a lamp, or may be a device that outputs audio notification such as a speaker.

In the straddle-type vehicle information processor 10, each of the sections may collectively be accommodated in a single casing, or each of the sections may be accommodated in a separate casing. In addition, the straddle-type vehicle information processor 10 may partially or entirely be constructed of a microcomputer, a microprocessor unit, or the like, may be constructed of a member in which firmware and the like can be updated, or may be a program module or the like that is executed by a command from a CPU or the like, for example.

<Operation of Straddle-Type Vehicle Information Processor>

A description will be made on an operation of the straddle-type vehicle information processor according to the embodiment.

Figure 2:
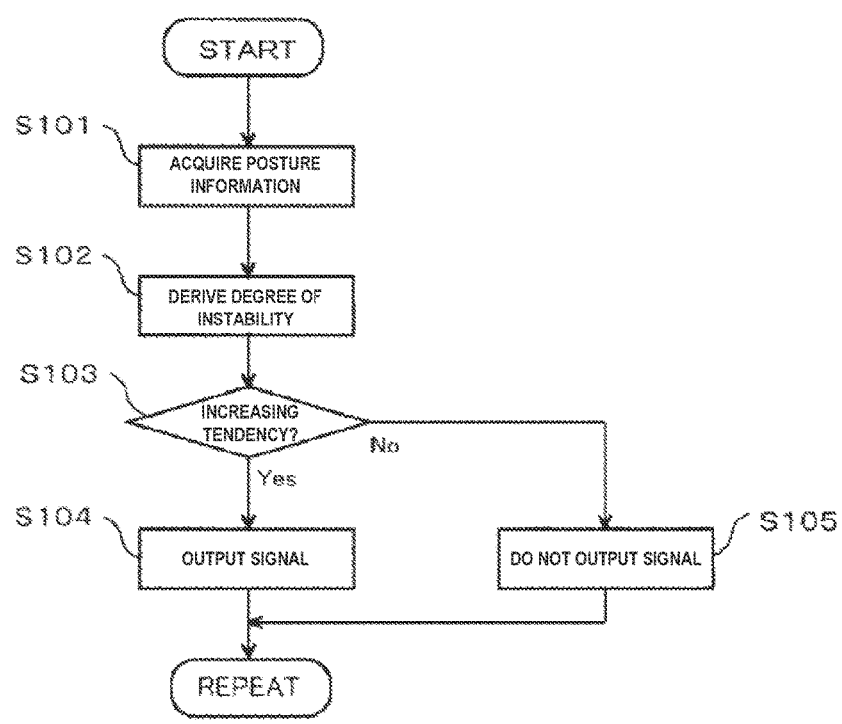
FIG. 2 is a flowchart of an exemplary operation by the straddle-type vehicle information processor according to the embodiment of the invention.

FIG. 2 is a flowchart of an exemplary operation by the straddle-type vehicle information processor according to the embodiment of the invention.

When the straddle-type vehicle 1 is brought into a travel state, the straddle-type vehicle information processor 10 repeatedly executes an operation flow depicted in FIG. 2.

(Posture Information Acquisition Step)

In step S101, the posture information acquisition section 11 acquires, as the posture information, the roll rate Rr and the yaw rate Ry that are generated in the traveling straddle-type vehicle 1. The posture information acquisition section 11 may acquire raw data (that is, unprocessed data) that is detected by the posture information sensor 20 as the roll rate Rr and the yaw rate Ry, or may acquire data that is acquired by eliminating noise from the raw data (that is, the unprocessed data) detected by the posture information sensor 20 as the roll rate Rr and the yaw rate Ry.

(Falling Phase Recognition Step)

Next, in step S102, the falling phase recognition section 12 derives a degree of instability α of the traveling straddle-type vehicle 1 on the basis of the acquired roll rate Rr and the acquired yaw rate Ry. The falling phase recognition section 12 may derive the degree of instability α through calculation, or may derive the degree of instability α by referring to a lookup table or the like, which is created in advance.

More specifically, the degree of instability α is derived as a value that is calculated by using the following equation 1. Note that a roll rate index Rrs in the equation 1 is a value that is acquired by standardizing the roll rate Rr, which is acquired in step S101, with respect to a reference roll rate Rr_ref. In addition, a yaw rate index Rys in the equation 1 is a value that is acquired by standardizing the yaw rate Ry, which is acquired in step S101, with respect to a reference yaw rate Ry_ref. Each of the reference roll rate Rr_ref and the reference yaw rate Ry_ref is defined as a value supposedly acquired when the straddle-type vehicle 1 is in a common reference state. For example, the reference state is a state immediately before the straddle-type vehicle 1 falls over. In such a case, maximum values of the roll rate Rr and the yaw rate Ry that are acquired when the straddle-type vehicle 1 falls over after the falling phase are experimentally calculated in an actual vehicle test or the like, for example. Then, those roll rate Rr and yaw rate Ry can be set as the reference roll rate Rr_ref and the reference yaw rate Ry_ref, respectively.

$$\alpha = \sqrt{Rrs^2 + Rys^2} \qquad \text{[Equation 1]}$$

Note that, in the equation 1, the degree of instability α is derived as a square root of a sum of squares of the roll rate index Rrs and the yaw rate index Rys. However, the degree of instability α may be derived as a root mean square of the roll rate index Rrs and the yaw rate index Rys. In addition, the degree of instability α may be defined as a value that is acquired by another average calculation (an arithmetic mean).

Next, in step S103, the falling phase recognition section 12 determines whether a change in the derived degree of instability α over time shows an increasing tendency. If the change in the degree of instability α over time shows the increasing tendency, the processing proceeds to step S104. If the change in the degree of instability α over time does not show the increasing tendency, the processing proceeds to step S105.

More specifically, the falling phase recognition section 12 determines that the degree of instability α shows the increasing tendency in the case where a change tendency of the degree of instability α in a reference period Term_ref is a monotonic increase. The reference period Term_ref is defined to have: a time point at which the latest roll rate Rr and the latest yaw rate Ry are acquired as an end point Tend; and a time point at which the roll rate Rr and the yaw rate Ry prior to the predetermined number of the data from the end point Tend are acquired as a start point Tstart.

For example, the falling phase recognition section 12 derives an approximate quadratic curve C that approximately represents the change tendency of the degree of instability α in the reference period Term_ref on the basis of a degree of instability αstart at the start point Tstart, a degree of instability αend at the end point Tend, and a sum of the degrees of instability α at time points in the reference period Term_ref. The falling phase recognition section 12 may derive the approximate quadratic curve C by referring to a lookup table or the like, which is created in advance. Then, in the case where a time point Te at which an extremum αe of the approximate quadratic curve C is acquired falls out of the reference period Term_ref, the falling phase recognition section 12 determines that the change tendency is the monotonic increase. With such a determination, regardless of whether the increasing tendency of the degree of instability α is a gradual increase or the increasing tendency of the degree of instability α is a gradual decrease, it is possible to easily determine whether the degree of instability α shows the monotonic increase.

Figure 3:
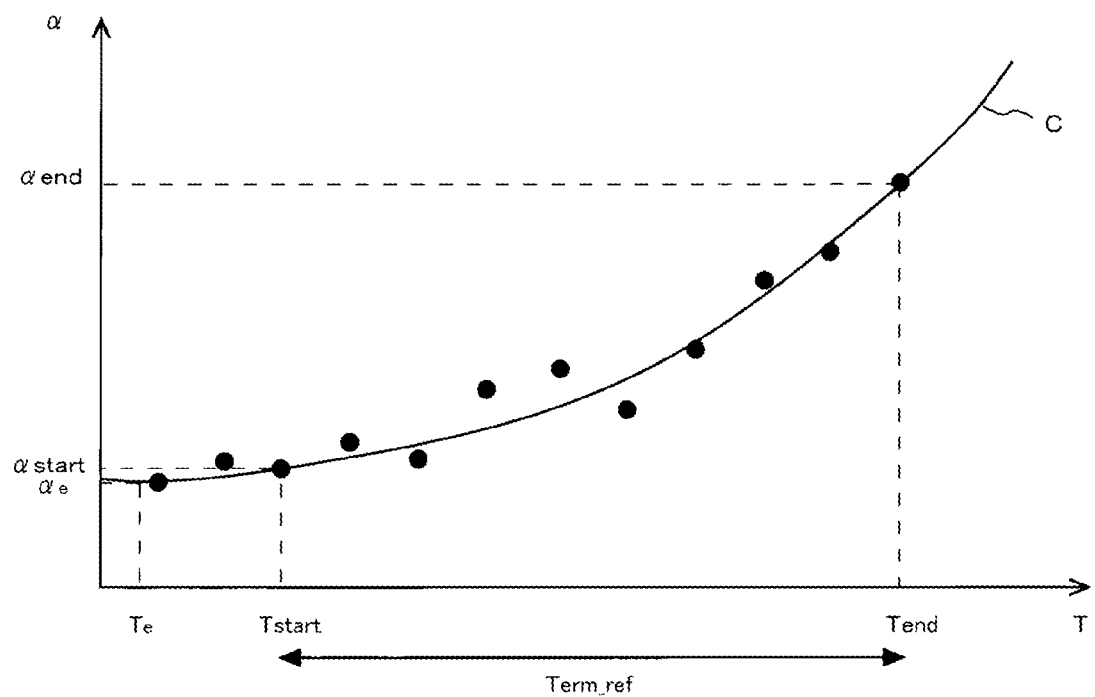
FIG. 3 is a graph illustrating an example of a determination on a change tendency of a degree of instability by the straddle-type vehicle information processor according to the embodiment of the invention.

FIG. 3 is a graph illustrating an example of the determination on the change tendency of the degree of instability by the straddle-type vehicle information processor according to the embodiment of the invention.

More specifically, in the case where the increasing tendency of the degree of instability α is the gradual increase, as depicted in FIG. 3, the approximate quadratic curve C is derived as a curve that protrudes downward. In addition, in the case where a portion of the approximate quadratic curve C that is located in the reference period Term_ref shows the monotonic increase, the time point Te, at which the extremum αe of the approximate quadratic curve C is acquired, appears as a time point prior to the start point Tstart, that is, as a time point that falls out of the reference period Term_ref. Accordingly, in the case where the increasing tendency of the degree of instability α is the gradual increase, it is possible to determine whether the degree of instability α shows the monotonic increase by determining whether the time point Te, at which the extremum αe of the approximate quadratic curve C is acquired, falls out of the reference period Term_ref.

Figure 4:
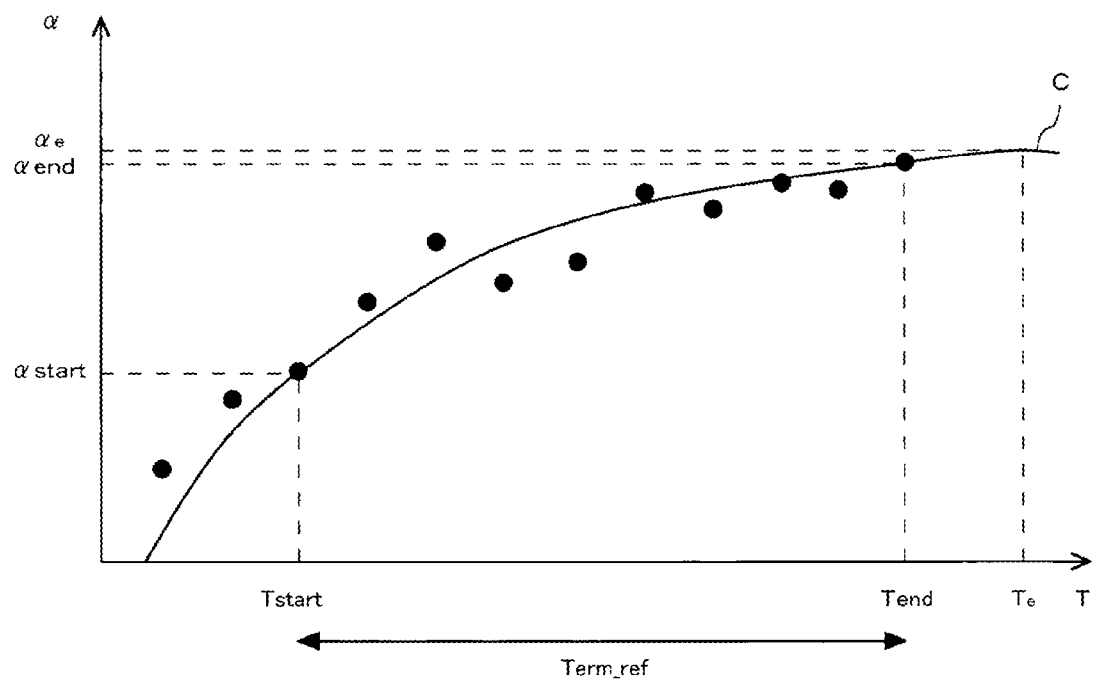
FIG. 4 is a graph illustrating another example of the determination on the change tendency of the degree of instability by the straddle-type vehicle information processor according to the embodiment of the invention.

FIG. 4 is a graph illustrating another example of the determination on the change tendency of the degree of instability by the straddle-type vehicle information processor according to the embodiment of the invention.

In the case where the increasing tendency of the degree of instability α is the gradual decrease, as depicted in FIG. 4, the approximate quadratic curve C is derived as a curve that protrudes upward. In addition, in the case where the portion of the approximate quadratic curve C that is located in the reference period Term_ref shows the monotonic increase, the time point Te, at which the extremum αe of the approximate quadratic curve C is acquired, appears as a time point posterior to the end point Tend, that is, as a time point that falls out of the reference period Term_ref. Accordingly, also in the case where the increasing tendency of the degree of instability α is the gradual decrease, it is possible to determine whether the degree of instability α shows the monotonic increase by determining whether the time point Te, at which the extremum αe of the approximate quadratic curve C is acquired, falls out of the reference period Term_ref.

The falling phase recognition section 12 may change the reference period Term_ref in accordance with a change in a possibility of falling of the traveling straddle-type vehicle 1. For example, the falling phase recognition section 12 may change the reference period Term_ref in accordance with a body speed of the straddle-type vehicle 1, may change the reference period Term_ref in accordance with an operation state by the occupant, or may change the reference period Term_ref in accordance with a driving technique of the occupant. In a situation where the possibility of falling is high, the falling phase recognition section 12 sets the reference period Term_ref as a shorter period than the reference period Term_ref that is set in a situation where the possibility of falling is low.

Alternatively, the falling phase recognition section 12 may derive another approximate curve instead of the approximate quadratic curve C, and may determine the change tendency of the degree of instability α on the basis of the other approximate curve. In such a case, the approximate curve can be derived by a known processing method such as a least squares method or a moving average method.

(Output Step)

Next, in step S104, the output section 13 outputs a signal for making the notification device 30 execute or continue a notifying operation. Meanwhile, in step S105, the output section 13 does not output the signal for making the notification device 30 execute or continue the notifying operation.

<Application Example—1 of Operation of Straddle-Type Vehicle Information Processor>

The above description has been made on the case where the falling phase recognition section 12 determines whether the straddle-type vehicle 1 enters the falling phase only on the basis of the change in the degree of instability α of the traveling straddle-type vehicle 1 over time. However, the above determination may be made on the basis of the change in the degree of instability α of the traveling straddle-type vehicle 1 over time and another index value.

A change rate of the degree of instability α is an example of the other index value. For example, the falling phase recognition section 12 recognizes that the straddle-type vehicle 1 does not enter the falling phase in the cases where it is determined that the change tendency of the degree of instability α in the reference period Term_ref is the increasing tendency and where the change rate of the degree of instability α is lower than a reference value. In addition, for example, the falling phase recognition section 12 recognizes that the straddle-type vehicle 1 enters the falling phase in the cases where it is determined that the change tendency of the degree of instability α in the reference period Term_ref is not the increasing tendency and where the change rate of the degree of instability α is higher than the reference value.

A change rate of the yaw rate Ry is another example of the other index value. For example, the falling phase recognition section 12 recognizes that the straddle-type vehicle 1 does not enter the falling phase in the cases where it is determined that the change tendency of the degree of instability α in the reference period Term_ref is the increasing tendency and where the change rate of the yaw rate Ry is lower than a reference value. In addition, for example, the falling phase recognition section 12 recognizes that the straddle-type vehicle 1 enters the falling phase in the cases where it is determined that the change tendency of the degree of instability $\alpha$ in the reference period Term_ref is not the increasing tendency and where the change rate of the yaw rate Ry is higher than the reference value.

<Application Example—2 of Operation of Straddle-Type Vehicle Information Processor>

The above description has been made on the case where it is determined whether the straddle-type vehicle 1 enters the falling phase regardless of the travel state of the straddle-type vehicle 1. However, such recognition that the straddle-type vehicle 1 enters the falling phase may be prohibited in the case where a state amount (for example, a throttle opening degree or the like) that corresponds to engine brake generated in the traveling straddle-type vehicle 1 has a value that corresponds to the engine brake, a magnitude of which exceeds a reference. When the operation of the straddle-type vehicle information processor 10 itself is prohibited, such recognition by the falling phase recognition section 12 that the straddle-type vehicle 1 enters the falling phase may be prohibited, or the output of the signal from the output section 13 may be prohibited.

<Effects of Straddle-Type Vehicle Information Processor>

A description will be made on effects of the straddle-type vehicle information processor according to the embodiment.

In the straddle-type vehicle information processor 10, at least the roll rate Rr and the yaw rate Ry generated in the traveling straddle-type vehicle 1 are acquired as the posture information, and it is recognized that the straddle-type vehicle 1 enters the falling phase in the case where the change in the degree of instability $\alpha$ over time, which is derived at least on the basis of the roll rate Rr and the yaw rate Ry, shows the increasing tendency. Accordingly, even in the case where one of three-axis angular velocities of the straddle-type vehicle 1 is abruptly increased during the travel, such erroneous recognition that the straddle-type vehicle 1 enters the falling phase is prevented. In addition, it is possible to recognize that the straddle-type vehicle 1 enters the falling phase at a stage before one of the three-axis angular velocities becomes excessively high. Therefore, the occupant safety can be improved.

Preferably, the degree of instability $\alpha$ is derived at least on the basis of the roll rate index Rrs and the yaw rate index Rys. Here, the roll rate index Rrs is acquired by standardizing the roll rate Rr with respect to the reference roll rate Rr_ref, and the reference roll rate Rr_ref corresponds to the roll rate Rr at the time when the straddle-type vehicle 1 is in the reference state. The yaw rate index Rys is acquired by standardizing the yaw rate Ry with respect to the reference yaw rate Ry_ref, and the reference yaw rate Ry_ref corresponds to the yaw rate Ry at the time when the straddle-type vehicle 1 is in the reference state. The roll rate Rr and the yaw rate Ry generated during falling have different values from each other. Thus, in the case where none of the roll rate Rr and the yaw rate Ry is standardized, the determination is made under a significant influence of only one of the roll rate Rr and the yaw rate Ry. In other words, due to the standardization of the roll rate Rr and the yaw rate Ry, it is reliably recognized that the straddle-type vehicle 1 enters the falling phase.

In particular, the degree of instability $\alpha$ is preferably derived on the basis of the square root of the sum of squares or the root mean square of at least the roll rate index Rrs and the yaw rate index Rys. With such an operation, the plural indices (the roll rate index Rrs and the yaw rate index Rys) can collectively be processed as the single index (the degree of instability $\alpha$). Thus, the processing can be simplified while an increase of a processing load is prevented.

The reference state is preferably any state from the time point at which the straddle-type vehicle 1 enters the falling phase to the time point at which the straddle-type vehicle 1 falls over. That is, the reference roll rate Rr_ref and the reference yaw rate Ry_ref are preferably the roll rate Rr and the yaw rate Ry that are acquired in any state from the time point at which the straddle-type vehicle 1 enters the falling phase to the time point at which the straddle-type vehicle 1 falls over. With such an operation, the roll rate Rr and the yaw rate Ry can be standardized with respect to the appropriate references.

Preferably, the falling phase recognition section 12 determines that the degree of instability $\alpha$ shows the increasing tendency in the case where the change tendency of the degree of instability $\alpha$ in the reference period Term_ref is the monotonic increase. With such an operation, it is possible to recognize that the straddle-type vehicle 1 enters the falling phase with high robustness.

In particular, the falling phase recognition section 12 preferably derives the approximate quadratic curve C on the basis of the degree of instability $\alpha$start at the start point Tstart and the degree of instability $\alpha$end at the end point Tend in the reference period Term_ref as well as the sum of the degrees of instability $\alpha$ at the time points in the reference period Term_ref, and preferably determines that the change tendency is the monotonic increase in the case where the time point Te at which the extremum $\alpha$e of the approximate quadratic curve C is acquired falls out of the reference period Term_ref. Compared to the automobile, the track, and the like, travel stability and the occupant safety of a motorcycle are especially low. Accordingly, it is required to speed up the falling phase recognition processing and thereby increase a reaction rate of the motorcycle. In the case where the falling phase recognition section 12 is operated as described above, the change tendency can be determined at the extremely high speed.

The falling phase recognition section 12 preferably changes the reference period Term_ref in accordance with the change in the possibility of falling of the traveling straddle-type vehicle 1. With such an operation, it is possible to secure the high robustness and promptly recognize that the straddle-type vehicle 1 enters the falling phase.

Preferably, in the cases where it is determined that the degree of instability $\alpha$ shows the increasing tendency and where the other index value, which is used to recognize that the traveling straddle-type vehicle 1 enters the falling phase, falls below the reference, the falling phase recognition section 12 recognizes that the traveling straddle-type vehicle 1 does not enter the falling phase. The examples of the other index value are the change rate of the degree of instability $\alpha$ and the change rate of the yaw rate Ry. With such an operation, a frequency of the erroneous recognition that the traveling straddle-type vehicle 1 enters the falling phase can be decreased.

Preferably, in the cases where it is determined that the degree of instability $\alpha$ does not show the increasing tendency and where the other index, which is used to recognize that the traveling straddle-type vehicle 1 enters the falling phase, satisfies the reference, the falling phase recognition section 12 recognizes that the traveling straddle-type vehicle 1 enters the falling phase. The examples of the other index value are the change rate of the degree of instability $\alpha$ and the change rate of the yaw rate Ry. With such an operation, even in a situation where the determination on the change tendency of the degree of instability α is unreliable, it is possible to recognize the falling phase.

Preferably, in the case where the state amount that corresponds to the engine brake generated in the traveling straddle-type vehicle 1 has the value corresponding to the engine brake, the magnitude of which exceeds the reference value, such recognition that the straddle-type vehicle 1 enters the falling phase is prohibited. With such an operation, in the operation state where the straddle-type vehicle 1 is unlikely to fall over, a frequency of unnecessarily notifying the occupant that the straddle-type vehicle 1 enters the falling phase can be decreased.

Preferably, the straddle-type vehicle 1 is the two-wheeled motor vehicle. Since the travel stability and the occupant safety of the two-wheeled motor vehicle are especially low, the above operations are particularly effective in the two-wheeled motor vehicle.

The description has been made so far on the embodiment. However, the invention is not limited to the description of the embodiment. For example, only a part of the embodiment may be implemented, or parts of the embodiment may be combined.

The above description has been made on the case where the degree of instability α is derived only on the basis of the roll rate index Rrs and the yaw rate index Rys. However, the invention is not limited to such a case. In other words, the degree of instability α only has to be derived at least on the basis of the roll rate index Rrs and the yaw rate index Rys.

For example, the posture information acquisition section 11 may acquire a pitch rate Rp generated in the traveling straddle-type vehicle 1 as the posture information in addition to the roll rate Rr and the yaw rate Ry. In addition, the degree of instability α may be derived as a value that is calculated by using the following equation 2. Note that a pitch rate index Rps in the equation 2 is a value that is acquired by standardizing the pitch rate Rp, which is generated in the traveling straddle-type vehicle 1, with respect to a reference pitch rate Rp_ref. The reference pitch rate Rp_ref is defined as a value that is acquired when the straddle-type vehicle 1 is in the reference state (that is, a state where the roll rate Rr and the yaw rate Ry generated in the traveling straddle-type vehicle 1 correspond to the reference roll rate Rr_ref and the reference yaw rate Ry_ref).

$$\alpha = \sqrt{Rrs^2 + Rys^2 + Rps^2} \quad \text{[Equation 2]}$$

Note that, similar to the equation 1, in the equation 2, the degree of instability α is derived as a square root of a sum of squares. However, the degree of instability α may be derived as a root mean square. In addition, the degree of instability α may be defined as a value that is acquired by another average calculation (the arithmetic mean).

The case where the output section 13 outputs the signal to the notification device 30 has been described so far. However, the invention is not limited to such a case, and the output section 13 may output the signal to another device. For example, the output section 13 may output the signal to a vehicle body behavior controller (a brake controller, an engine controller, a suspension controller, or the like), and the vehicle body behavior controller may execute an operation to avoid falling of the straddle-type vehicle 1 in response to the signal.

REFERENCE SIGNS LIST

1: Straddle-type vehicle
10: Straddle-type vehicle information processor
11: Posture information acquisition section
12: Falling phase recognition section
13: Output section
20: Posture information sensor
30: Notification device
Term_ref: Reference period
Tstart: Start point
Tend: End point
α, αstart, αend, αe: Degree of instability
C: Approximate quadratic curve

The invention claimed is:

1. A straddle-type vehicle information processor (10) comprising:
    a posture information acquisition section (11) that acquires posture information of a traveling straddle-type vehicle (1); and
    a falling phase recognition section (12) that recognizes that the traveling straddle-type vehicle (1) enters a falling phase on the basis of a change in the posture information, which is acquired by the posture information acquisition section (11), over time, wherein
    the posture information acquisition section (11) at least acquires a roll rate (Rr) and a yaw rate (Ry) that are generated in the traveling straddle-type vehicle (1) as the posture information, and
    the falling phase recognition section (12) recognizes that the straddle-type vehicle (1) enters the falling phase in the case where a change in a degree of instability (α) of said traveling straddle-type vehicle (1) over time shows an increasing tendency, the degree of instability (α) being derived at least on the basis of the roll rate (Rr) and the yaw rate (Ry) acquired by the posture information acquisition section (11).

2. The straddle-type vehicle information processor according to claim 1, wherein
    in the cases where it is determined that the degree of instability (α) does not show the increasing tendency and where another index value used to recognize that the traveling straddle-type vehicle (1) enters the falling phase satisfies a reference, the falling phase recognition section (12) recognizes that the traveling straddle-type vehicle (1) enters the falling phase.

3. The straddle-type vehicle information processor according to claim 1, wherein
    in the case where a state amount that corresponds to engine brake generated in the traveling straddle-type vehicle (1) has a value corresponding to the engine brake, a magnitude of which exceeds a reference, such recognition that said straddle-type vehicle (1) enters the falling phase is prohibited.

4. The straddle-type vehicle information processor according to claim 1, wherein
    the straddle-type vehicle (1) is a two-wheeled motor vehicle.

5. The straddle-type vehicle information processor according to claim 1, wherein
    the degree of instability (α) is derived at least on the basis of a roll rate index (Rrs) and a yaw rate index (Rys), said roll rate index (Rrs) is acquired by standardizing the roll rate (Rr) with respect to a reference roll rate (Rr_ref) that corresponds to the roll rate (Rr) at a time when the straddle-type vehicle (1) is in a reference state, and said yaw rate index (Rys) is acquired by standardizing the yaw rate (Ry) with respect to a reference yaw rate (Ry_ref) that corresponds to the yaw rate (Ry) at a time when said straddle-type vehicle (1) is in said reference state.

6. The straddle-type vehicle information processor according to claim 5, wherein
the degree of instability (α) is derived on the basis of a square root of a sum of squares or a root mean square of at least the roll rate index (Rrs) and the yaw rate index (Rrs).

7. The straddle-type vehicle information processor according to claim 5, wherein
the reference state is any state from a time point at which the straddle-type vehicle (1) enters the falling phase to a time point at which the straddle-type vehicle (1) falls over.

8. The straddle-type vehicle information processor according to claim 1, wherein
the falling phase recognition section (12) determines that the degree of instability (α) shows the increasing tendency in the case where a change tendency of the degree of instability (α) in a reference period (Term ref) is a monotonic increase.

9. The straddle-type vehicle information processor according to claim 8, wherein
the falling phase recognition section (12) derives an approximate quadratic curve (C) on the basis of a degree of instability (αstart) at a start point (Tstart) and a degree of instability (αend) at an end point (Tend) in the reference period (Term ref) as well as a sum of the degrees of instability (α) at time points in the reference period (Term ref), and determines that the change tendency is the monotonic increase in the case where a time point (Te) at which an extremum (αe) of said approximate quadratic curve (C) is acquired falls out of said reference period (Term ref).

10. The straddle-type vehicle information processor according to claim 8, wherein
the falling phase recognition section (12) changes the reference period (Term ref) in accordance with a change in a possibility of falling of the traveling straddle-type vehicle (1).

11. The straddle-type vehicle information processor according to claim 1, wherein
in the cases where it is determined that the degree of instability (α) shows the increasing tendency and where another index value used to recognize that the traveling straddle-type vehicle (1) enters the falling phase falls below a reference, the falling phase recognition section (12) recognizes that the traveling straddle-type vehicle (1) does not enter the falling phase.

12. The straddle-type vehicle information processor according to claim 11, wherein
the other index value is a change rate of the degree of instability (α).

13. The straddle-type vehicle information processor according to claim 11, wherein
the other index value is a change rate of the yaw rate (Ry).

14. A straddle-type vehicle information processing method comprising:
a posture information acquisition step (S101) of acquiring posture information of a traveling straddle-type vehicle (1); and
a falling phase recognition step (S102, S103) of recognizing that the traveling straddle-type vehicle (1) enters a falling phase on the basis of a change in the posture information, which is acquired in the posture information acquisition step (S101), over time, wherein
in the posture information acquisition step (S101), at least a roll rate (Rr) and a yaw rate (Ry) that are generated in the traveling straddle-type vehicle (1) are acquired as the posture information, and
in falling phase recognition step (S102, S103), it is recognized that the straddle-type vehicle (1) enters the falling phase in the case where a change in a degree of instability (α) of said traveling straddle-type vehicle (1) over time shows an increasing tendency, the degree of instability (α) being derived at least on the basis of the roll rate (Rr) and the yaw rate (Ry) acquired in the posture information acquisition step (S101).

* * * * *